United States Patent [19]
Thoma et al.

[11] 3,719,708
[45] March 6, 1973

[54] BETA-SEMICARBAZIDE PROPIONIC ACID HYDRAZIDE

[75] Inventors: Wilhelm Thoma, Bergisch Neukirchen; Harald Oertel, Odenthal-Gloebusch; Heinrich Rinke, Leverkusen-Schlesbusch; Ulrich Bahr, Dormagen, all of Germany

[73] Assignee: Farbenfabriken Bayer Aktiengesellschaft, Leverkusen, Germany

[22] Filed: Nov. 20, 1970

[21] Appl. No.: 91,563

Related U.S. Application Data

[62] Division of Ser. No. 830,128, June 3, 1969, Pat. No. 3,640,937.

[52] U.S. Cl. .................................................260/554
[51] Int. Cl. ............................................C07c 133/02

[58] Field of Search ........................................260/554

[56] References Cited

OTHER PUBLICATIONS

Schlogl et al., Monatsh. Vol. 82, pp. 799–814, (1951).

*Primary Examiner*—Leon Zitver
*Assistant Examiner*—Michael W. Glynn
*Attorney*—Plumley & Tyner

[57] ABSTRACT

Beta-semicarbazide propionic acid hydrazide is disclosed as a compound useful for chain extension in preparation of highly elastic linear segmented polyurethanes with excellent thermal and hydrothermal properties.

1 Claim, No Drawings

BETA-SEMICARBAZIDE PROPIONIC ACID HYDRAZIDE

This application is a divisional application of Ser. No. 830,128 filed June 3, 1969, now U.S. Pat. 3,640,937.

This invention relates to highly elastic linear segmented polyurethanes comprising segments obtained from certain semicarbazide hydrazides chain extending agents, highly elastic fibers thereof and to a process for the preparation of said linear, segmented polyurethane elastomers.

It is already known that substantially linear, relatively high molecular weight NCO-terminated preadducts (hereinafter referred to in short as NCO-preadducts or NCO-prepolymers), prepared from relatively high molecular weight polyhydroxy compounds (optionally in the presence of relatively small quantities of low molecular weight diols) and excess molar quantities of organic diisocyanates, can be reacted in highly polar organic solvents such as dimethyl formamide with substantially bifunctional chain extenders containing two active hydrogen atoms, resulting in the formation of viscous solutions of substantially linear polyurethane elastomers which can be processed from the solution and converted into elastic filaments or films. Suitable chain extenders include in particular diamines, preferably aliphatic or araliphatic diamines, hydrazine or dihydrazide compounds. Diamines and hydrazine are highly reactive with respect to the NCO-preadducts which preferably comprise aromatically linked NCO groups, with the result that non-uniform crosslinked components ("jellyfish") are likely to be formed in the elastomer solution. In order to reduce this crosslinking tendency, a number of chemical modifications involving the use of expensive technical equipment are necessary.

In contrast, the reactivity of dihydrazide compounds as chain extenders (cf. German Pat. No. 1,123,467) with NCO pre-adducts is reduced to such an extent that their reaction can be displaced particularly favorably without the disadvantage of chemical cross-linking and the accompanying formation of so-called "jellyfish" in the solution. Polyurethane elastomer solutions of this kind can be spun into highly elastic filaments of outstanding tensile strength and minimal permanent elongation.

Unfortunately, elastomer filaments of this kind chain-extended with dihydrazides also have certain disadvantages. It has been found for example that despite the outstanding elastic properties at room temperature that they often have the elastic behavior of, in particular above all, extended or elongated filaments at elevated temperature, in hot water or steam in particular, is not satisfactory. Thus, elastomer filaments of this kind can be stretched under minimal initial strain to a much greater extent in hot air than in air at room temperature, and after relaxation show considerable residual elongation. In particular, when elastomer filaments in a stretched state (for example at 100 percent elongation) are hydrothermally treated (for example in boiling water), the residual elongation levels are still high. These relatively low resistance in elastomer filaments, such as these extended with certain hydrazides, to extension under thermal or hydrothermal conditions is particularly undesirable in finishing and dyeing processes.

In addition, elastomer filaments of this kind are sensitive to the presence of traces of heavy metal ions. This occurs for example when carbodihydrazide is used as chain extender in the reaction with NCO-preadducts. Boiling with water containing copper ions in small quantities, for example, is sufficient to produce a change in the color of the filaments to pinkish-red, spoiling the appearance of undyed fabrics, even if there is no evidence of the strength property being affected. Oxalic acid dihydrazide is almost insoluble in dimethyl formamide and, after reaction with NCO-preadducts, gives elastomer filaments which, like filaments containing units from malonic acid or succinic acid dihydrazide chain extenders, are extremely sensitive to hydrolysis and are not sufficiently resistant to strain under hydrothermal conditions.

If ethylene bis-semicarbazide or hexamethylene bis-semicarbazide, for example is used instead of the dihydrazide compounds as chain extender in the reaction with the NCO-preadducts, the elastomer solutions obtained cannot be spun because they become gel-like in consistency after the short time, or even during their preparation. The polyurethane elastomers formed are probably inadequately solvated by the solvent with the result that they are precipitated in the form of a pasty gel which is either impossible or extremely difficult to convert into filaments or films.

An object of this invention are highly elastic substantially linear segmented polyurethanes obtained from essentially linear relatively high molecular weight NCO-preadducts and chain-extending agents, which contain the chain-extender segment $-NH-NH-CO-NH-(CH_2)_x-CO-NH-NH-$, ($x = 1$ or $2$) and which are obtained by reacting the relatively high molecular weight NCO-preadducts with substantially equivalent quantities of aliphatic semicarbazide hydrazides of the formula $H_2N-NH-CO-NH-(CH_2)^2-CO-NH-NH_2$, in highly polar organic solvents, and subsequently removing the solvents by evaporation or coagulation. In a preferred embodiment this reaction is carried out in such a way that segmented polyurethane elastomers are obtained consisting of reaction products of the essentially linear relatively high molecular weight NCO-preadducts with chain extenders containing at least 55 percent. based on all the chain-extender segments present, of a chain extension segment of the structure $-NH-NH-CO-NH-(CH_2)^2-CO-NH-HN-$.

A further object of the invention is an essentially linear segmented polyurethane elastomer consisting of a reaction product of an essentially linear relatively high molecular weight NCO-preadduct and a chain extending agent selected from the group consisting of $H_2N-NH-CO-NH-(CH_2)^2-CO-NH-NH_2$ and a mixture of $H_2N-NH-CO-NH-(CH_2)_x-CO-NH-NH_2$ and a conventional chain extending agent selected from the group consisting of water, hydrazine, a glycol, an amino alcohol, a diamine, and a dihydrazide.

In view of the known properties of elastomers containing units obtained from dihydrazides as chain extenders, and the behavior of corresponding bis-semicarbazides as chain extenders, we found it extremely surprising that the aliphatic semi-carbazide hydrazides of the formula $H_2N-NH-CO-NH-(CH_2)^2-CO-NH-NH_2$, gave elastomers with outstanding properties far superior to those of comparable dihydrazide-extended elastomers.

Polyurethane elastomers extended with β-semicarbazide propionic acid hydrazide in the above formula) have particularly outstanding properties, with the results that this hydrazide is preferably used as the bifunctional compound containing two active hydrogen atoms for chain extending the NCO-preadducts, particularly in cases where the polyurethanes are to be converted in elastomeric filaments. After the solution has been wet- or dry-spun in the usual way, elastomers such as these give high-grade elastomeric filaments with substantially improved thermal and hydrothermal properties, coupled with outstanding strength and elastic properties. The filaments and films are color stable in the presence of heavy metals, for example copper ions, and are much more resistant to hydrolysis than comparable dihydrazide compounds. In addition, the polyurethane elastomers are readily soluble in the usual solvents, such as dimethyl formamide or dimethyl acetamide.

The favorable set of properties is illustrated by the comparison tests in the Examples which follow.

The compound preferably used as chain extender, namely β-semicarbazide propionic acid hydrazide, is a new compound. Even minor changes in structure, for example with progression in the homologous series to γ-semicarbazide butyric acid hydrazide 3-$CH_2$'s in the above formula), are sufficient to reduce the properties of the elastomers chain-extended in this way in connection with their behavior under thermal and hydrothermal conditions, to below the adequate limit, for example, for elastomeric filaments. The outstanding properties of the products is only obtained with aliphatic semicarbazide hydrazide as defined above.

A further object of the invention are the following processes for preparing polyurethane elastomers containing the —NH—NH—CO—NH—$(CH_2)^2$—CO—NH—NH—segments:

a. Reacting the NCO-preadducts of relatively high molecular weight dihydroxy compounds and excess molar quantities of diisocyanates (NCO-content of the preadduct approximately between 1 percent and 6 percent NCO, based on the solids content) with substantially equivalent quantities of bifunctional low molecular weight chain extenders containing two active hydrogen atoms in the presence of highly polar organic solvents, aliphatic semicarbazide hydrazides of the formula $H_2N$—NH—CO—NH—$(CH_2)^2$—CO—NH—$NH_2$ being used, as chain extenders.

b. As (a) except that in addition to at least 55 mol percent of the semicarbazide hydrazides claimed up to 45 mol percent of conventional bifunctional compounds with at least two active hydrogen atoms and molecular weights of from 18 to about 300 (for example water, hydrazine, diamines, dihydrazides) are used as chain extenders.

c. Reacting an NCO-preadduct prepared from relatively high molecular weight dihydroxy compounds and low molecular weight diols with molecular weights of from 62 to about 300 and preferably containing 1 or 2 tertiary amino groups in the molecule, in quantities of from about 0.01 to 1.0 mol per mol of relatively high molecular weight dihydroxy compound, and excess molar quantities of diisocyanates (NCO content of the solid NCO-preadduct approximately between 1% and 6% NCO) with substantially equivalent quantities of aliphatic semicarbazide hydrazides $H_2N$—NH—CO—NH—$(CH_2)^2$—CO—NH—$NH_2$ as chain extenders in highly polar solvents.

d. Reacting an NCO-preadduct prepared as described in c), with substantially equivalent quantities of chain extenders, comprising at least 55 mol percent of the semicarbazide hydrazides $H_2N$—NH—CO—NH—$(CH_2)^2$—CO—NH—$NH_2$ and up to 45 mol percent of conventional chain extenders being used.

The products obtained by the process are linear, segmented polyurethane elastomers consisting of intralinear segments of the structure I) ⫨ O—D—O—CO—NH—R—NH—CO ⫩$_r$ (O—G—O—CO—NH—R—NH—CO)$_s$⫩$_m$ [NH—NH—CO—NH—(CH$_2$)$_x$—CO — NH — NH — CO — NH — R — NH — CO ⫩$_n$ in which D represents a long chain, divalent substantially aliphatic polymer radical without any substituents reactive to isocyanate, and having a molecular weight of from 600 to 5000 and a melting point below 60°C; R represents a divalent organic radical of an aromatic, aliphatic, cycloaliphatic or araliphatic diisocyanate; G represents a divalent aliphatic cycloaliphatic or araliphatic radical of a dialcohol with molecular weight of from 62 to 300, preferably containing one or more tertiary aliphatic amino groups, without the terminal hydroxyl groups; $r$ is an integer of at least 1, e.g., from 1 to 5, preferably from 1 to 3; $s = 0$ or an integer of at least 1, e.g., from 1 to 5, preferably 1; $m =$ an integer of at least 1, e.g., 1 or an integer up to 5, preferably 1 to 3 and $n = 1$ or an integer of at least 1, e.g., up to 5, preferably 1 or 2.

These elastomers have a elongation at break of more than 300 percent and an inherent viscosity (as measured in a solution in hexamethylphosphoramide at 25°C) of at least 0.5 in order to obtain adequate elastic properties in the filaments and films.

In addition to the structural segments of Formula I, a maximum of up to 45 percent by weight of the substantially linear segmented polyurethane elastomers may preferably consist of intralinear segments of structure II which are obtained by reacting the NCO-preadducts with conventional chain extenders such as water or compounds containing two terminal $NH_2$ groups and which have the structure II) ⫨O—D—O—CO—NH —R—NH—CO⫩$_r$—(O—G—O—CO—NH—R—NH—CO)$_s$⫩$_m$—⫨NH—Z—NH—CO ⫩$_p$ NH—R—NH—CO⫩$_n$, in which D,G,R, $r$, $s$, $m$ and $n$ are as defined above, $p = 0$ or 1 and Z represents the radical of a conventional chain extender with two terminal $NH_2$ groups, $H_2N$—Z—$NH_2$, from which these $NH_2$-groups have been removed. Z can be absent or a divalent organic radical with from two to 13 carbon atoms, free of any substituents which react with isocyanates, for example a divalent aliphatic or cycoaliphatic radical with at most 13 carbon atoms, preferably the

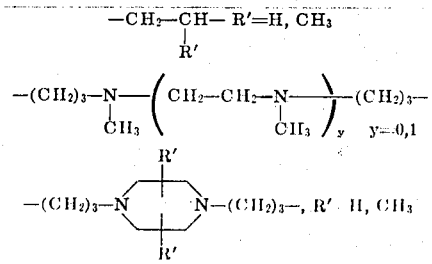

cis/trans mixture

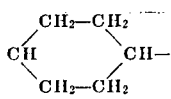

- radical, a divalent aromatic radical without any condensed rings, preferably a

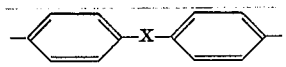

radical; in which X is absent or

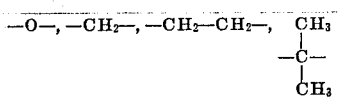

a divalent araliphatic radical, preferably a 1,3- or 1,4-

radical, y = 0,1, or a radical —HN—CO—R''—CO—NH—, —HN—CO—NH—R''—NH—CO—NH—, in which R'' is a divalent organic radical with up to 13 carbon atoms, for example an aliphatic, cycloaliphatic or aromatic radical, preferably a

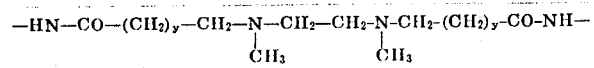

or

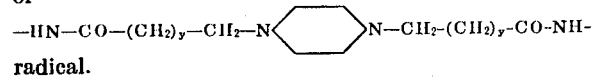

radical.

Examples of suitable relatively high molecular weight substantially linear polyhydroxyl compounds with terminal hydroxyl groups (of formula HO—D—OH) include polyesters, polyester amides, polyethers, polyacetals, polycarbonates or poly-N-alkylurethanes, other groups such as ester, ether, amide, urethane, N-alkylurethane groups optionally being present in the above compounds, with molecular weights of from 600 to 5000 and preferably from 800 to 3000, and having melting points preferably below 60°C., in particular, below 45°C. It is also possible to use mixtures of the relatively high molecular weight polyhydroxyl compounds.

Particularly useful are polyesters of adipic acid and dialcohols, if desired, mixtures of dialcohols, for example ethylene glycol, propylene glycol, 1,4-butane diol, 2,5-hexane diol, 2,2-dimethyl-1,3-propane diol, 1,6-hexane diol, 2-methyl-1,6-hexane diol, 2,2,-dimethyl-1,3-hexane diol, p-bis-hydroxylmethyl cyclohexane, 3-methyl-1,4-pentane diol, 2,2-diethyl-1,3-propane diol, more preferably mixtures of these with diols or mixtures of diols containing 5 or more carbon atoms, because polyesters of this kind show a very high resistance to hydrolysis. When the diols contain branched alkyl radicals, the polyesters also show outstanding low temperature elasticity in the end products. Polyesters, of narrow molecular weight distribution, (obtained by polymerizing caprolactones with glycols) are also eminently suitable starting materials.

Polyurethane elastomers that are highly resistant to hydrolysis can be obtained from polyalkylene ethers such as polytrimethylene ether diols, polypropylene glycols, and preferably from polytetramethylene ether diols which may also be used as mixed polyethers (by co-condensing small quantities of epoxides such as propylene oxide or epichlorhydrin), or after terminal group modification, for example replacing the OH groups by the —O—CO—N—(alkyl) CH$_2$—CH$_2$—OH— group. Polyepichlorhydrins with terminal OH-groups in the aforementioned molecular weight range are also suitable for use in production of fireproof end products. Basic polyethers whose tertiary amino groups may be quaternized at least in part, are also suitable. Polycarbonates containing 1,6-hexane diol as the main dialcohol in addition to other diols, are particularly suitable for use as the dialcohols.

One may use as the diisocyanate component (O=C=N=R=N=C=O), one or more of the following compounds: aliphatic, cycloaliphatic, araliphatic, aromatic diisocyanates and heterocyclic diiscoyanates. Aromatic diisocyanates of symmetrical structure are particularly suitable examples, including diphenyl methane-4,4'-diisocyanate; diphenyl dimethyl methane-4,4'-diisocyanate, phenylene-1,4-diisocyanate; 2,2',6,6'-tetramethyl diphenyl methane-4,4'-diisocyanate; diphenyl-4,4'-diisocyanate; diphenyl ether-4,4'-diisocyanate or their alkyl-, alkoxyl- or halogen-substituted derivatives; one may also use tolylene-2,4- or 2,6-diisocyanate or their commercial mixtures, 2,4-diiso-propyl phenylene-1,3-diisocyanate, m-xylene diisocyanate, p-xylene diisocyanate and $\alpha,\alpha,\alpha',\alpha'$-tetramethyl-p-xylylene diisocyanate. In addition one may also use the alkyl or halogen-substitution products of the above-mentioned diisocyanates, for example 2,5-dichloro-p-xylylene diisocyanate or tetrachloro-p-phenylene diisocyanate, dimeric tolylene-2, 4-diisocyanate or bis-3-methyl-4-isocyanatophenyl urea. Aliphatic diisocyanates such as hexane-1,6-diisocyanate, cyclohexane-1,4-diisocyanate, dicylohexylmethane-4,4'-diisocyanate, 1-isocyanato-3-isocyanatomethyl-3,5,5-trimethyl cyclohexane or 2,2,4-trimethyl hexane-1,6diisocyanate, may also form at least part of the isocyanates used and, following exposure to light, give end products showing little or no discoloration. Diisocyanates such as $\omega,\omega,'$-di(isocyanatoethyl)-benzene or 1,2,3,4,5,6-hexahydro diphenylmethane-4,4'-diisocyanate also gives products showing little or no dis-coloration after exposure to light.

By virtue of their commercial availability, diphenyl methane-4,4'-diisocyanate, diphenyl ether-4,4'-diisocyanate, phenylene-1,4-diisocyanate, the isomeric tolylene diisocyanates and, to a limited extent, hexane-1,6-diisocyanate and dicyclohexylmethane-4,4'-diisocyanate, are preferably used.

To prepare the substantially linear relatively high molecular weight NCO-preadducts, the relatively high molecular weight polyhydroxyl compounds referred to above, HO—D—OH, are reacted with the diisocyanates in excess molar quantities, for example in a molar ratio of 1:1.25 to 1:4.0, preferably from 1:1.30 to 1:2.5, with the diisocyanates optionally added in stages, in the melt or in the solvents inert with respect to isocyanates such as tetrahydrofuran, dioxan, ethyl acetate, butanone-2 or chlorobenzene, dimethyl formamide, at temperatures of from about 10° to 130°C, and preferably at temperatures of from 20° to 100°C. Where the relatively high molecular weight polyhydroxyl compounds have fairly low molecular weights, for example, from 650 to 1250, the diisocyanates are preferably reacted in lower molar ratios, for example from 1:1.25 to 1:2.0. They are preferably used in higher molar ratios, for example from 1:1.5 to 2.5 in cases where they have relatively high molecular weights.

If a polyhydroxyl compound OH—D—OH is reacted with a diisocyanate OCN—R—NCO in a molar ratio of 1:2, an NCO-preadduct with the idealized structure O=C=N—R—NH—CO—O—D—O—CO—NH—R—N=C=O is formed. If the reaction is carried out with a molar ratio of 1:1.5 (=2:3), an NCO-preadduct with the general structure O=C=N—R—NH—CO—O—D—O—NH—R—NH—CO—O—D—O—CO—NH—R—N=C=O is formed.

To all intents, the same structure is obtained in cases where the polyhydroxyl compounds are initially reacted with an OH/NCO ratio of 2:1 and the new "pre-extended" dihydroxy compound subsequently converted into the NCO-preadduct, optionally in conjunction with another diisocyanate, with an OH/NCO ratio of 1:2. With other molar ratios, statistical mixtures of corresponding NCO-preadducts can be formed.

In the preparation of the NCO-preadducts, relatively small quantities of low molecular weight diols OH—G—OH with molecular weights of from 62 to about 300, in particular those which contain one or more tertiary amino groups, may be used together with the relatively high molecular weight polyhydroxyl compounds HO—D—OH for the reaction with the diisocyanates.

The diols may be added either in admixture with the relatively high molecular weight polyhydroxyl compounds or at any time during or even after the NCO-preadduct has been formed from the diisocyanate and relatively high molecular weight polyhydroxyl compounds. Suitable diols include, for example, ethylene glycol, 1,4-butane diol, bis-N,N-($\beta$-hydroxy ethyl)-methyl amine; bis-N,N-($\beta$-hydroxypropyl)-methyl amine; N-N'-dimethyl-N,N'-bis($\beta$-hydroxy ethyl)-ethylene diamine; N,N'-dimethyl-N,N'-bis-($\beta$-hydroxy propyl)-ethylene diamine; N,N'-bis-($\beta$-hydroxy propyl)-piperazine; N,N'-bis-($\beta$-hydroxy ethyl)-piperazine or hydroquinone-bis-($\beta$-hydroxy ethyl ether). The use of diols containing tertiary amino groups improves in particular the affinity for dyes and fastness to light of the products and provides a starting point for other after treatments, for example the cross-linking reaction with 4,4'-dichloro methyl diphenyl ether.

The low molecular weight diols are generally used in quantities of from 0.01 to 1.0 mol and preferably in quantities of from 0.05 to 0.5 mol. They may be used to particular advantage in quantities of from 0.07 to 0.25 mol per mol of polyhydroxyl compound in the formation of the NCO-preadduct. In these cases, the quantity in which the diisocyanate used is preferably increased to beyond the molar ratios which have just been specified by an amount corresponding to the low molecular weight diols, for example by 0.01 to 1.0 mol. This results in the formation of NCO-preadducts with the structure O=C=N—R—NH—CO—O—D—O—CO—NH—R—NH—CO—O—G—O—CO—NH—R—N=C=O, or in the case of "pre-extension" in the formation of an NCO-preadduct with the structure O=C=N—R—NH—CO—O—D—O—CO—NH—R—NH—CO—O—D—O—CO—NH—R—NH—CO—O—G—O—CO—NH—R—N=C=O.

The typical structural segments of the NCO-preadducts (which may also be termed "relatively high molecular weight diisocyanates") which arise out of "pre-extension" or glycol incorporation, are formed in a more or less statistical sequence and may optionally occur in multiple repetition.

The number of NCO groups present in the NCO-preadducts (calculated as percent by weight of NCO in the solvent-free NCO-preadduct is of decisive importance to the properties of the polyurethane elastomers obtained from them. Generally speaking, it is only those NCO-preadducts whose NCO content in the solid amounts to at least 1.0 percent, that are suitable for reaction with the semi-carbazide hydrazides to be used as chain extenders in accordance with the invention. The NCO-preadducts should preferably contain from 1.5 to about 6 percent by weight of NCO. NCO contents of from 1.75 to 3.5 percent, based on the solids content of the NCO-preadduct, are particularly preferred in cases where the elastomers obtained from them are to be used for the production of elastomer filaments.

Aliphatic semicarbazides hydrazides of the formula $H_2N—NH—CO—NH—(CH_2)^2—CO—NH—NH_2$ are used in substantially stoichiometrically equivalent quantities, based upon the number of NCO groups in the NCO-preadduct, as the bifunctional chain extenders containing 2 active hydrogen atoms, and are preferably employed as the sole chain extenders. $\beta$-Semicarbazide propionic acid hydrazide is preferably used in the production of elastomeric filaments.

It is also possible however in addition to at least 55 percent of the aliphatic semicarbazide hydrazides, to use up to 45 mol percent of other conventional chain extenders with molecular weights of from 18 to about 300, for example water or preferably compounds containing two terminal $NH_2$-groups of the formula $H_2N—Z—NH_2$ in which Z is zero or represents a bivalent organic radical with from two to 13 carbon atoms.

Examples of suitable conventional chain extenders include water, glycols, amino alcohols or preferably organic compounds with two terminal $NH_2$ groups, such as hydrazine (or hydrazine hydrate), aliphatic diamines, preferably ethylene diamine, 1,2-propylene diamine, cis- and/or trans-1,3-diaminocyclohexane, N,N-bis-($\gamma$-aminopropyl)-methyl amine; N,N'-dimethyl-N,N'-bis-($\gamma$-aminopropyl)-ethylene diamine; N,N'-bis-($\gamma$-aminopropyl)-piperazine; N,N'-bis-($\gamma$-aminopropyl)-2,5-dimethyl-piperazine, aromatic diamines, preferably 4,4'-diamino diphenylmethane; 4,4'-diamino diphenyl ether, 4,4'-diamino diphenyl ethane, or 4,4'-diamino diphenyl dimethylmethane; araliphatic diamines such as m- or p-xylylene diamine, 1,4-bis-($\beta$-aminoethyl)-benzene or or $\alpha,\alpha,\alpha',\alpha'$-tetramethyl-p-xylylene diamine; or dihydrazides, bis-semicarbazides or bis-carbazine esters such as carbodihydrazide, terephthalic acid dihydrazide, hydroquinone diacetic acid dihydrazide, amino acetic acid hydrazide, methyl amino-N,N-bis-(propionic acid hydrazide), N,N'-piper-azine-bis-(propionic acid hydrazide), N,N'-dimethyl ethylene diamine-N,N'-bis-(propionic acid hydrazide).

In order to reduce the molecular weight and, in spite of any molecular branching that may have occured, to obtain soluble polyurethane elastomers, it is also possible to use monofunctional compounds in small quantities for chain-terminating reactions for example in quantities of from 0.01 to 10 mol percent, (based on the NCO content). Butyl amine, dibutyl amine, acethydrazide, butyl semicarbazide, N,N'-dimethyl hydrazine may be used for this purpose.

The NCO-preadducts are reacted with the chain extenders in substantially stoichiometric equivalent quantities (based on the NCO content), for example, in quantities of from 100 to 120 percent and preferably in quantities of from 100 to 110 mol percent of chain extenders, advantageously at temperatures of from about 0° to 130°C and preferably at temperatures of from 20° to 80°C, in the presence of solvents. The higher the excess of chain extenders, the lower will be the molecular weight of the polyurethane. The required molecular weight and solution viscosity may be adjusted by the careful addition of other preferably less reactive aliphatic di- or tri-isocyanates (according to German Pat. specification No. 1,157,386). After the required viscosity has been obtained, the still unreacted terminal groups may be stabilized by reaction with mono isocyanates such as butyl isocyanate, carboxylic acid anhydrides or other acylating substances such as acid chlorides or carbamic acid chlorides, e.g., acetanhydride, phthalic acid anhydride, acetyl-chloride.

Suitable solvents in which the process of the invention may be carried out include highly polar, organic water-soluble solvents which contain amide, urea or sulphonic groups, are capable of forming strong hydrogen bridge bonds and which preferably have boiling points of from about 140° to 225°C, for example dimethyl formamide, diethyl formamide, dimethyl acetamide, N-formyl morpholine, hexamethylphosphoramide, tetramethyl urea, dimethyl sulphoxide, dimethyl cycanamide or mixtures thereof. For commercial reasons, dimethyl formamide or dimethyl acetamide is preferably used as the solvent. Less polar solvents which on their own are not able to dissolve the polyurethanes and polyurethane ureas, for example tetrahydrofuran, dioxan, acetone, ethylene glycol, monoethyl ether acetate or chlorobenzene, may be added to the highly polar solvents in quantities of up to 33 percent by weight of the total amount of solvent. The semicarbazide-hydrazides are advantageously first dissolved in a minor amount of water (such as twice the weight of semicarbazide-hydrazide) and then diluted with the highly polar organic solvents (such as dimethyl formamide). The concentration of the elastomer solutions should amount to between about 5 and 43 percent by weight, preferably to between 10 and 33 percent and more, preferably to between 15 and 28 percent by weight, with the viscosities lying between 1 and 3000 poises/20°C. and preferably between about 50 and 800 poises/20°C. The molecular weight of the segmented elastomers according to the invention should be so high that the inherent viscosity as measured at 25°C., $\eta_i = \ln\eta_R/C$, amounts to at least 0.5 and preferably to between 0.70 and 1.9 when determined with a solution of 1.0 g of elastomer which has been dissolved in 100 ml of hexamethyl phosphoramide (phosphoric acid tris-dimethylamide) at 20°C. In the above equation, $\eta_R$ is the relative viscosity (ratio of the through-flow time of the solution to the through-flow time of the solvent) while $C$ is the concentration in g/100 ml. The melting points of the elastomers, as determined on Kofler benches) should be above 200°C. and preferably above 220°C. in cases where they are to be used as starting materials for elastomer filaments.

The solutions of the polyurethanes and polyurethane ureas may have added to them organic or inorganic pigments, dyes, optical brighteners, UV-absorbers, phenolic anti-oxidants, special UV-absorbers such as N,N-dialkyl semi-carbazides or N,N-dialkyl hydrazides and crosslinking substances, for example paraformaldehyde, melamine hexamethylol ether or other formaldehyde derivatives such as dimethylol dihydroxy ethylene urea, dimethylol ethylene urea, trimethylol melamine and dimethylol urea dimethyl ether, quaternizing agents, for example dichloromethyl durol or polyaziridine ureas, for example hexamethylene-$\omega,\omega$-bis-ethylene imide urea. The resistance to the dissolution and the swelling effect of highly polar solvents is modified for example by using a thermally initiated crosslinking reaction.

The solvent may be removed from the elastomer solutions by a variety of methods known per se, including evaporation or coagulation, in some cases accompanied by formation of the required shaped product such as filaments or foils. Films or coatings are produced by allowing the elastomer solution to dry on substrates, for example glass plates or textile products. Filaments can be obtained by wet or dry spinning. Microporous coatings are obtained by coating elastomer solutions or water-containing dispersions on to (optionally textile) substrates, eventually holding the coated polyurethane in an atmosphere of moist air for some time followed by coagulation in non-solvents for the polyurethane, for example water, organic solvents or mixtures thereof. The microporosity of the films can be increased by use of suitable additives such as finely divided salts, emulsifiers or soluble polyamides.

The parts indicated in the following examples are always parts by weight unless otherwise stated.

The films and filaments referred to in the examples were prepared and measured by the following standard processes:

Films: by brushing the elastomer solution on to glass panels and allowing it to dry (30 minutes at 70°C, + 45 mins. at 100°C), final thickness from about 0.15 to 0.25 mm. Some filaments of from about 250 to 800 den thick were cut out of the films by means of a film-cutting machine and measured.

Wet spinning process: an elastomer solution, preferably of 20 percent by weight concentration is spun at a rate of about 1 ml/min through a 20-hole spinerette (bores 0.12 mm in diameter) into a coagulating bath heated to 80°–85°C of 90 percent by weight of water/10 percent by weight of dimethyl formamide (length approximately 3 m), and wound up at a take off rate of 5 m per minute after passing through a washing zone (water/90°C). The bundles are stored in boiling water (50°C for 1 hour) and then dried.

Dry spinning process: a preferably 24 to 26 percent by weight elastomer solution is spun through a 16-hole spinerette (bore diameter 0.20 mm) into a shaft 5 m long heated to 220°–250°C into which air heated to between 210° and 280°C is blown. The filaments are run off at a rate of about 100 m per minute and, following treatment with a talcum suspension, optionally accompanied by stretching, are wound up for example at a rate of 125 to 175 m per minute. The filaments may then be heat treated either while on bobbins or in continuous form.

Elongation at break is measured in a tensile testing machine. The distance between the grips is monitored by a light barrier, and the amount of slip duly compensated.

In the elasticity data which is given below, the modulus at 300 percent is shown in the first elongation curve, the modulus at 150% in the third recovery curve, whilst the permanent elongation is determined after three times 300 percent elongation, 30 seconds after relaxation.

The heat distortion temperature (HDT) of elastomers is determined as follows:

The denier of elastomeric filaments laid out for some 3 hours under normal climatic conditions completely free of tension, is determined by weighing a 450 mm long length of filament under an initial strain of 0.05 mg/den.

An elastomeric yard is suspended at room temperature in a tube which contains air or is filled with nitrogen, under an initial load of 2 mg/den, the distance between the grips being 250 mm. The tube is surrounded by a heating jacket through which flow a silicone oil heated and with its temperature thermostatically controlled. The temperature inside the tube is first of all increased to about 125°C over a period of about 30 minutes. Thereafter, the temperature is increased at a rate of 3°C every 5 minutes until the elastomeric filament has undergone a change in length of more than 400 mm. The measurements obtained are plotted in a graph in such a way that on the abscissa 1 unit of length corresponds to a temperature difference of 10°C whilst on the ordinate 1 unit of length corresponds to a change in length of the elastomeric filament of 20 mm. The heat distortion temperature (HDT) is the temperature read off by vertically projecting the point of contact of the 45° tangent to the temperature/length change curve on the abscissa.

In general, the resistance of the elastomers to heat may be more highly assessed, the higher the HDT-value which is found. For high grade elastomer filaments, the value should amount to at least 145°C and preferably to higher than 150°C.

Determining the hot-water-induced decrease in tension (HWDT) of elastomeric filaments is carried out as follows:

A length of filament held between grips 100 mm, apart is stretched by 100 percent at a temperature of 20°C and the tension (mg/den) produced in it after 2 minutes is measured (first value). The filament still stretched by 100 percent is then immersed in water heated to 95°C and the tension produced after a residence time of 3 minutes is measured (second value). After this measurement, the filament is removed from the water bath and left for 2 minutes at room temperature. The filament still held between the grips is then released until free of tension and the permanent residual elongation measured (third value).

Plan of the reproduction in the examples (abbreviation HWDT):

| 1st value Strain value in air at 20°C (mg/den) | 2nd value in water at 95°C (mg/den) | 3rd value Residual elongation after relaxation (in air) at 20°C % |
|---|---|---|

This hydrothermal properties may be assessed more accurately, the greater the second value (tension in hot water mg/den) and the smaller the third value (residual elongation after treatment in the relaxed state). The strain value in water should amount to at least 15 mg/den and to more than 20 mg/den in the case of high grade elastomer filaments. After hydrothermal treatment, the residual elongation in the relaxed state should be less than 45 percent and preferably less than 40 percent. Determination the hot water elongation (HWE) of elastomeric filaments is carried out as follows:

A weight of 30 mg/den is attached by means of a clip through a 50 mm long filament, and is left suspended in air for 25 minutes at room temperature. After 25 minutes, the percentage elongation is determined (first value). The filament thus elongated is then immediately immersed in water heated to 95°C together with the weight attached to it and the elongation occurring under water is read off after an interval of 25 minutes. It is expressed as percentage elongation based on the distance between grips 50 mm (second value). The weighted filament is then removed from the hot water bath, after which its permanent residual elongation is determined by lifting the weight until the filament is free of tension (3rd value).

Plan of the reproduction in the examples (abbreviation HWE):

| 1st value in air at 20°C % | 2nd value Elongation in water at 95°C % | 3rd value Residual elongation (after relaxation in air at 20°C) % |
|---|---|---|

This hydrothermal properties may be assessed more highly, the smaller the second value (elongation in hot water) and the smaller the third value (permanent elongation after relaxation). For high grade elastomer filaments, the second value should be less than 250 percent and preferably less than 150 percent, whilst the residual elongation (third value) should be less than 150 percent and preferably less than 100 percent.

The melting point of the elastomer substance is measured on a strip of film after it has been placed for a period of 2 minutes on a Kofler bench, and should be above 200°C and preferably above 230°C for elastomeric filaments.

In order to determine the inherent viscosity $\eta_i$, samples of the elastomeric substance (films) are dissolved in a concentration of 1.0 g of elastomeric substance per 100 ml, in hexamethylene phosphoramide at room temperature, and the relative viscosity $\eta_R$ $\eta_R$ = Flow out time of the solution/Flow out time of the solvent measured in an Ubbelohde viscosimeter at a temperature of 20°C. The inherent viscosity may be calculated from the relative viscosity in accordance with the equation $$\eta_i = \ln \eta_R / C$$

($C$ = concentration in g/100 ml).

Preparation of the new semicarbazides:

1. α-semicarbazide acetic acid hydrazide:

140 parts of phenylchlorocarbonic acid ester are dissolved in 500 parts by volume of methylene chloride. The solution is cooled to 0°–5°C and 100 parts of water are poured over it.

139.5 parts of solid glycine ethyl ester hydrochloride are introduced in portions and at the same time a solution of 56 parts of potassium hydroxide, 80 parts of potassium carbonate and 25 parts of potassium hydrogen carbonate in 300 parts of water is added dropwise over a period of 30 mins. The two-phase reaction system is then stirred for another 2½ hrs without cooling, the phases separated, the methylene chloride solution dried over anhydrous sodium sulphate and finally the methylene chloride is distilled offf. The carbethoxy methylene carbamic acid phenyl ester is obtained as an oil in a yield of 91 percent. The oil crystallizes on prolonged standing, mp. 32°C.

$C_{11}H_{13}N_4$ (Molecular weight 223) calculated : N 6.3 O 28.7 found: N 6.2 O 28.3

310 parts of carbethyoxy methylene carbamic acid phenyl ester in 125 parts by volume of alcohol are added dropwise to a boiling solution of 280 parts of hydrazine hydrate in 250 parts by volume of ethanol, and the reaction solution is kept boiling for 1½ hours. After the reaction solution has cooled to 0°C, the white crystals precipitating in large quantities are filtered under suction, washed with alcohol and dried. The semicarbazide acetic acid hydrazide is obtained in a crude yield of 91 percent of the theoretical. After recrystallization from alcohol (2 ml/g) and water (1.5 ml/g), pure colorless crystals are obtained in a yield of 71 percent, mp. 167°C.

$C_3H_9N_5O_2$ (Molecular weight 147) Calculated : N.47.6 % Found: N 47.5 % ii. β-semicarbazide propionic acid hydrazide :

712 parts of β-alanine are added into 920 parts by volume of alcohol. 400 parts of hydrogen chloride are introduced beginning at 20°C and progressing with rapid heating to boiling point (20 minutes): the mixture is kept boiling for a period of 2 hours. After some 1½ hours, the suspension has become a clear solution. On completion of the dissolution, 460 parts by volume of benzene are added in order to azeotropically distill off the water of esterification. Finally, the residual alcohol is distilled off, ultimately in vacuo (15 mm. Hg). The ester/HCl salt is obtained as an oil in a quantitative yield. The oil crystallizes on standing or a vigorous cooling.

1180 parts of phenyl chlorocarbonic acid ester are dissolved in 3800 parts by volume of methylene chloride, and 700 parts of water are added to the resulting solution which is then cooled to 0°– 7°C. 1228 parts of β-alanine ethyl ester hydrochloride are added dropwise into the two-phase system from a heated dropping funnel, a solution of 450 parts of potassium hydroxide and 1090 parts of potassium carbonate in 2600 parts of water being simultaneously run in. The dropwise addition takes about 60 minutes to complete. The two-phase system is then stirred for 2½ hours without cooling, the phases are separated, the methylene chloride solution is dried over anhydrous sodium sulphate and finally the methylene chloride is distilled off. The β-carbethoxy ethylene carbamic acid phenyl ester is an oil which crystallizes after prolonged standing, mp.63°C, yield approximately 75 percent of the theoretical.

A solution of 1336 parts of β-carbethoxy ethylene carbamic acid phenyl ester in 800 parts by volume of alcohol is introduced over a period of approximately 30 minutes into a boiling solution of 1900 parts of hydrazide hydrate and 480 parts by volume of alcohol. After boiling for 1½ hours, the solution is cooled to 0°C, the crude β-semicarbazidopropionic acid hydrazide which has crystallized out is quickly filtered under suction and the filtrate is suspended in alcohol and is then sharply suction-filtered again. After drying, the crude yield amounts to 872 parts (96.5 percent of the theoretical). Recrystallization from water (0.9 ml/g) and alcohol (2.0 ml/g) gives 628 parts or 72 percent of the theoretical of pure β-semicarbazido propionic acid hydrazide, mp.163°–64°C.

$C_4H_{11}N_5O_2$ (Molecular weight 161) calculated : N 43.46% Found: N 43.45%

The following Examples illustrate more particularly the invention.

EXAMPLE I 1200 parts of a mixed polyester of adipic acid and a glycol mixture of 1,6-hexane diole/2,2-dimethyl propane diol in a molar ratio of 65:35 (OH number 68.0, mp.34°–36°C) are heated for 53 minutes to 92°–96C with 23.55 parts of N,N-bis-(β-hydroxy propyl)-methylamine, 335.4 parts of diphenyl methane-4,4'-diisocyanate and 389 parts of chlorobenzene, and the resulting mixture is left to cool to room temperature. The NCO-preadduct solution has an NCO content of 1.9 percent)= 2.38 percent of NCO in the solid).

400 parts of the above NCO-preadduct solution are stirred within a matter of minutes into a solution heated to 70°C of 14.85 parts of β-semicarbazide propionic acid hydrazide in 985 parts of dimethyl formamide, resulting in the formation of a moderately viscous elastomer solution whose viscosity is increased by the addition of 12 parts of another NCO-preadduct. After pigmenting with 4% $TiO_2$, the viscosity amounts to 855 poises/20°BC.

Part of this solution is spun by the dry spinning process (cf. General procedures) and, after dilution to 20 percent another part is spun by the wet spinning process to give elastomeric filaments whose properties are set out in Table I and compared with the results from comparative tests. The elastomeric filaments do not show any signs of discoloring after 1 hour's immersion in or brief boiling in ammoniacal $CuSO_4$ solution.

The inherent viscosity of the elastomer substance is 1.27, and its melting point (Kofler bench) 230°C.

COMPARATIVE TESTS

The structurally most similar dihydrazide/or bis-semicarbazide chain extenders : succinic acid dihydrazide (a) and ethylene bis-semicarbazide (b) and carbodihydrazide (c) preferably used as chain extender for elastomeric filaments, are used for comparison, together with the NCO-preadduct that was used as described above for extension with β-semicarbazide propionic acid hydrazide.

COMPARATIVE TEST (a) Succinic acid dihydrazide 400 parts of the NCO-preadduct solution of Example I (1.9 percent) are reacted in a solution heated to approximately 70°C of 14.2 parts of succinic acid dihydrazide in 922 parts of dimethyl formamide to form a moderately viscous elastomer solution whose viscosity increases following the addition of another 28.5 parts of NCO-preadduct. After pigmenting with 4% of $TiO_2$, the solution has a viscosity of 610 poises at 20°C. It is then spun into elastomeric filaments as described in the preceding Example (See Table 1 for results). The solid elastomer has a melting point of 224°C.

COMPARISON TEST (b) Ethylene bis-semicarbazide 400 parts of the NCO-preadduct solution of Example I (1.9% NCO) are introduced into a solution heated to 70°C of 16.24 parts of ethylene bis-semicarbazide in 928 parts of dimethyl formamide. A non-uniform solution is obtained after only about half the pre-adduct has been added, turning into a stiff, crumbly mass as more preadduct is added (inadequate solubility of the elastomer). The paste cannot be spun or shaped. Even when N-methylpyrrolidone is used in place of dimethyl formamide it is not possible to obtain a solution, even with fairly strong dilution to a solids content of 20%. It is not possible to conduct any spinning tests, nor is it possible to obtain uniform films.

COMPARATIVE TEST (c) Carbodihydrazide 400 parts of the NCO-preadduct solution of Example 1 (1.9% NCO) are introduced into a solution heated to 70°C of 8.76 parts of carbodihydrazide in 907 parts of dimethyl formamide, resulting in the formation of a moderately viscous elastomer solution. Following the addition of 23 parts of more NCO-preadduct and pigmenting with 4% $TiO_2$, the viscosity of the elastomer solution increases to 645 poises/20°C. It is spun as described in Example 1, the results being set out in the following Table.

The filaments turn dark-red-brown in color following treatment with ammoniacal $CuSO_4$ solution.

The results of Table 1 show that the filaments produced in accordance with the invention show outstanding mechanical and elastic properties, and that their thermal and hydrothermal properties are substantially improved. Thus, the heat distortion temperature (HDT) is considerably improved, while the hot water elongation (HWE) of weighted filaments is considerably lower and the tension in filaments stretched by 100% in hot water (HWDT) is at least twice as high as it is in the comparative filaments. The residual elongation as determined by this measurement is also very much lower than in the comparative filament.

EXAMPLE 2

1200 parts of the mixed polyester described in Example 1, 15.9 parts of bis-(β-hydroxy propyl)-methyl amine, 283.4 parts of diphenyl methane-4,4'-diisocyanate and 321 parts of chlorobenzene are heated for 35 minutes to 95° – 98°C, and the resulting NCO-preadduct solution is subsequently cooled to room temperature. The solution has an NCO content of 2.01% (corresponding to 2.5% of NCO, based on solids content).

TABLE I

| Example number | | Fineness (den.) | Elastic properties | | | | Thermal and hydrothermal properties | | | | | | |
|---|---|---|---|---|---|---|---|---|---|---|---|---|---|
| | | | Tensile strength (g./den.) | Breaking elongation (percent) | Modulus at 300% (mg./den.) | Modulus at 150% 3 recovery curve (mg./den.) | Permanent elongation after 3X 300% (percent) | HDT (°C.) | HWDT strain | | Residual elongation after hot-water treatment (percent) | HWE elongation | | Residual elongation after relaxation (in air 20° C.) |
| | | | | | | | | | In air 20° C. (mg./den.) | In water 95° C. (mg./den.) | | In air 20° C. (percent) | In water 95° C. (percent) | |
| 1 | Wet-spinning test | 294 | 0.65 | 500 | 177 | 22 | 17 | 163 | 50.2 | 20.9 | 36 | 54 | 186 | 80 |
| | Dry-spinning test* | 158 | 0.75 | 481 | 219 | 25 | 17 | | 48.1 | 22.9 | 36 | 68 | 148 | 68 |
| | Film | 324 | 0.70 | 532 | 130 | 23 | 13 | | | | | | | |
| | Wet-spinning test | 317 | 0.62 | 537 | 104 | 19 | 16 | 128 | 33.6 | 9.0 | 60 | 92 | 800%, then failed | |
| | Dry-spinning test* | 169 | 0.63 | 469 | 114 | 18 | 16 | | 30.9 | 5.9 | 62 | 106 | 800%, then failed | |
| | Film | 285 | 0.71 | 523 | 88 | 19 | 13 | | | | | | | |
| Comparative test (a) | Wet-spinning test | | | | | | | | | | | | | |
| | Dry-spinning test* | | | Cannot be spun or cast into films | | | | | | | | | | |
| | Film | | | | | | | | | | | | | |
| Comparative test (b) | Wet-spinning test | | | | | | | | | | | | | |
| | Dry-spinning test* | | | Cannot be spun or cast into films | | | | | | | | | | |
| | Film | | | | | | | | | | | | | |
| Comparative test (c) | Wet-spinning test | 306 | 0.75 | 542 | 112 | 21 | 16 | 145 | 35.8 | 11.6 | 50 | 44 | 354 | 142 |
| | Dry-spinning test* | 154 | 0.75 | 399 | 144 | 21 | 17 | | 40.9 | 14.1 | 48 | 96 | 406 | 200 |
| | Film | 353 | 0.75 | 547 | 106 | 21 | 13 | | | | | | | |

* Measurements were conducted on filaments from dry-spinning tests which had been heated for 1 hour at 130° C. on bobbins under a pre-elongation of 50%.

TABLE 2

Resistance to hydrolysis of elastomeric filaments (dry-spinning test, v=50) after immersion for 16 hours in a washing liquor of 2 g./litre of soap and 5 g./litre of soda at 90° C.]

| | | Tensile strength (g./den.) | Breaking elongation (percent) | Permanent elongation (percent) | Remarks |
|---|---|---|---|---|---|
| Filament according to Example (1) | Original value | 0.75 | 481 | 17 | Filaments colourless. |
| | After hydroylsis for 16 hours | 0.67 | 397 | 16 | Do. |
| Comparative test (a) | Original value | 0.63 | 469 | 16 | Do. |
| | After hydrolysis for 16 hours | (1) | (1) | (1) | |
| Comparative test (c) | Original value | 0.75 | 400 | 17 | Do. |
| | After hydrolysis for 16 hours | 0.64 | 426 | 19 | Filaments red in colour. |

[1] After only 4 hours, the filaments can no longer be measured, filaments blocked after 16 hours totally blocked, no more mechanical strength.

NOTE.—The test results set out in Table 2 show that elastomeric filaments produced in accordance with the invention are stable to hydrolysis and highly resistant to discolouration, whilst the comparative filaments were either hydrolytically degraded or underwent marked discolouration.

400 parts of the above NCO-preadduct solution are introduced at 70°C into a solution of 16.5 parts of semicarbazide propionic acid hydrazide in 932 parts of dimethyl formamide, resulting in the formation of a viscous elastomer solution which is pigmented with 4% of $TiO_2$ (based on solids content) and then mixed with 0.33 part of 1,6-hexane diisocyanate at room temperature, the final viscosity of the elastomeric solution amounting to 560 poises. Films about 0.2 mm. thick are cast from part of the elastomer solution on to glass plates, and then cut into filaments with a fineness of about 300 den. Part of the remainder of the elastomer solution is diluted with dimethyl formamide to a concentration of 20 percent, and is wet-spun (see Table 3 for results).

COMPARATIVE EXAMPLE (d) Reaction with hydrazine 400 parts of the NCO-preadduct solution of Example 2, (2.01% NCO) are stirred into a solution of 5.16 parts of hydrazine hydrate in 895 parts of dimethyl formamide, resulting in the formation of an elastomer solution which is not quite homogenous and which contains a few so-called "jellyfish" (116 poises (20°C)). After pigmenting with 4% of $TiO_2$ (based on solids content) 0.5 part of 1,6-hexane diisocyanate are stirred into the solution at room temperature, producing a rise in viscosity to 465 poises (20°C).

Some of the yellowish elastomer solution is converted into film from which filaments were cut, while the rest is wet-spun in the form of a 20 percent solution (see Table 3 for results).

EXAMPLE 3

Mixed chain extension with 55 mol percent of β-semicarbazide propionic acid hydrazide and 45 mol percent of hydrazine.

8.70 parts of β-semicarbazide propionic acid hydrazide are dissolved with heating in 800 parts of dimethyl formamide and the resulting solution is mixed at 45°C with a solution of 2.45 parts of hydrazide hydrate in 116 parts of dimethyl formamide. 430 parts of the NCO-preadduct solution described in Example 2 are introduced at room temperature, resulting in the formation of a very high viscosity homogenous elastomer solution which, following the addition of 320 parts of dimethyl formamide and pigmenting with 4% of $TiO_2$, has a viscosity of 558 poises at 20°C. The results of tests conducted on films and filaments are set out in Table 3. The solid elastomer has a melting point of 234°C.

TABLE 3

| | | Fineness (den.) | Plastic properties | | | Modulus at 150% (3rd recovery) (mg./den.) | Perma-elongation (percent) | (Hydro) thermal properties | | | | |
|---|---|---|---|---|---|---|---|---|---|---|---|---|
| | | | Tensile strength (g./den.) | Breaking elongation (percent) | Modulus at 300 (mg./den.) | | | HWE | HWDT | | Resid.* elong. percent | HDT (°C.) |
| | | | | | | | | | In air | $H_2O$ | | |
| Example 2 | Cut yarn | 332 | 0.69 | 598 | 128 | 22 | 17 | | | | | |
| | Wet-spin test | | | | | | | 40/144/68 | 52.8 | 20.4 | 40 | 164 |
| Comparative test (d). | Cut yarn | 290 | 0.67 | 553 | 110 | 22 | 16 | | | | | |
| | Wet-spin test | | | | | | | 703/36/154 | 37.2 | 14.7 | 45 | 162 |
| Example 3 | Cut yarn | 323 | 0.81 | 550 | 123 | 23 | 10 | | | | | |
| | Wet-spin test | | | | | | | 58/236/104 | 47.3 | 17.5 | 43 | |

*After hydrothermal loading.

NOTE.—The results demonstrate the advantageous mechanical properties and the improved hydrothermal properties in relation to the comparison test with hydrazine extension. With mixed extension (Example 3), the hydrothermal properties are improved accordingly in relation to the comparative test.

EXAMPLE 4

6500 parts of a mixed polyester of the kind described in Example 1, having a hydroxyl number of 67.4, are dehydrated for 1 hour at 130°C/12 mm.Hg, and deactivated by the addition of 65 ml of a 30% solution of $SO_2$ in dioxane. After brief heating in vacuo, the polyester is mixed with 129 parts of N,N-bis-(β-hydroxy propyl)-methyl amine, and 1782 parts of diphenyl methane-4,4'-diisocyanate at a temperature of 45°C which is subsequently increased to 80° – 85°C, an NCO-preadduct with an NCO content of 2.24% NCO being formed after heating for 80 minutes.

6360 parts of the NCO-preadduct melt are introduced over a period of 15 minutes into a solution of 297.5 parts of β-semicarbazide propionic acid hydrazide in 18,813 parts of dimethyl formamide after the suspension of 267 parts of $TiO_2$ pigment, 33.5 parts of tris-(3,5-di-tert.-butyl-4-hydroxy benzyl) mesitylene and 1 part of hexane-1,6-diisocyanate is the resulting viscous solution. The high viscosity homogenous elastomer solution (770 poises) is dry-spun through a 40-hole spinerette (bore diameter 0.2 mm) into a shaft heated to approximately 220°C, and after preparation with an aqueous talcum suspension is wound at a rate of about 220 m per minute on to bobbins under an initial tension of 0 percent. 25 percent and 50 percent, and after-treated in a heating cabinet for 1 hour at 130°C.

The properties of the filaments together with those of filaments obtained by conventional wet-spinning processes, are set out in Table 4 which shows their outstanding hydrothermal properties which differ somewhat from one another depending upon the methods used to spin and after-treat the filaments. The solid elastomer has a melting point of 230°C.

hydrazide (cf. Example 5). The filaments have a melting point of 223°C.

EXAMPLE 7

300 parts of a commercial caprolactone polyester with a molecular weight of 830 and a melting point of 38° – 40°C (a product of the Union Carbide Company known as NIAX 520) are heated for 50 minutes to 94° – 95°C with 6.55 parts of N,N-bis-($\beta$-hydroxy propyl)-methyl amine, 124.3 parts of diphenyl methane-4,4'-diisocyanate and 185 parts of chlorobenzene. The

TABLE 4

| | Fineness (den.) | Tensile strength (g./den.) | Breaking elongation (percent) | Modulus (mg./den.) At 300% | Modulus (mg./den.) At 150%* | Permanent elongation after 3×300% stretching (percent) | HDT (° C.) | HWDT strain (mg./den.) In air 20° C. | HWDT strain (mg./den.) In water 95° C. | Residual elongation after hydrothermal loading (percent) | HWE extension (percent) In air 20° C. | HWE extension (percent) In water 95° C. | After relaxation (in air 20° C.) (percent) |
|---|---|---|---|---|---|---|---|---|---|---|---|---|---|
| Dry-spin test: | | | | | | | | | | | | | |
| V=C | 365 | 0.70 | 625 | 133 | 21 | 14 | ........ | 43.5 | 22.8 | 28 | 76 | 182 | 74 |
| V=25 | 277 | 0.74 | 569 | 195 | 24 | 13 | ........ | 50.1 | 25.4 | 26 | 68 | 110 | 42 |
| V=C | 238 | 0.83 | 540 | 238 | 26 | 12 | ........ | 59.9 | 31.5 | 24 | 60 | 94 | 36 |
| Wet-spin test | 296 | 0.59 | 161 | 246 | 23 | 14 | 163 | 52.2 | 22.0 | 29 | 48 | 162 | 30 |

*(3rd recovery curve).

EXAMPLE 5

300 parts of polytetramethylene ether diol (molecular weight 1020, melting point 33° – 35°C), and 6.45 parts of N,N-bis-($\beta$-hydroxy propyl)-methyl amine are heated for 36 minutes to 80° – 83°C with a solution of 114.1 parts of diphenyl methane-4,4'-diisocyanate in 180.5 parts of chlorobenzene. After cooling, the NCO-preadduct solution has an NCO content of 1.73% (corresponding to 2.37% of the NCO in the solid).

17.1 part of $\beta$-semicarbazide propionic acid hydrazide are dissolved at 95°C in 894 parts of dimethyl formamide and the resulting solution stirred at 60°C with 500 parts of the above NCO-preadduct solution. The solution then has a viscosity of 372 poises which is increased to 556 poises following the addition of 0.29 parts of p,p'-diisocyanate dicyclohexylmethane. The solution is pigmented with 4% TiO$_2$ (based on the solids content) and converted in the usual way into films or into filaments by dry or wet spinning. The solid elastomer has an inherent viscosity of 1.12. Both the thermal and the hydrothermal properties are excellent. The filaments do not undergo any decrease in strength under the normal conditions of hydrolysis (cf. Example 1), and have a melting point of from 227°–228°C.

EXAMPLE 6

500 parts of the NCO-preadduct solution described in Example 5 (1.73% NCO) are stirred over a period of 20 minutes into a solution heated to 65°C of 15.50 parts of semi-carbazide acetic acid hydrazide in 891 parts of dimethyl formamide. After cooling, a uniform colorless elastomer solution with a viscosity of 189 poises is obtained. This is given a pigment content of 4% by the addition of TiO$_2$. The viscosity rises to 561 poises after the addition of 15 parts of more NCO-preadduct solution. The elastomer has an inherent viscosity of 1.06.

The results of tests conducted on films and filaments are set out in Table 5. Both the thermal properties and the hydrothermal properties of the filaments are clearly less favorable than if they had been similarly extended with the homologous $\beta$-semicarbazide propionic acid resulting NCO-preadduct solution is then cooled to room temperature after which it contains 1.21% of NCO (corresponding to 1.725% of NCO in the solid substance).

12.5 parts of $\beta$-semicarbazide propionic acid hydrazide are dissolved in 882 parts of hot dimethylformamide. 500 parts of the above NCO-preadduct solution are stirred over a period of 10 minutes into this approximately 50°C solution, resulting in the formation of a high viscosity homogenous elastomer solution. Following dilution with 51 parts of dimethylformamide and the addition of 4% of TiO$_2$ (based on elastomer substance), the elastomer solution has a viscosity of 660 poises. The elastomer has an inherent viscosity $\eta_i$ of 1.26.

The data set out in Table 5 are obtained by casting the solution into films and spinning it in dry and wet spinning tests. The filaments obtained show outstanding hydrothermal properties. These elastomer filaments show a high resistance to hydrolysis. There is no decrease in tensile strength after hydrolysis for 16 hours in a washing solution of 2 g per liter of soda and 5 g/l of soap heated to 90°C.

EXAMPLE 8

100 parts of a linear polycarbonate (OH number 122.5, molecular weight 915, melting point about 30° – 35°C), prepared by the high temperature condensation of diphenyl carbonate and a mixture of the diols 1,6-hexane diol and $\beta$-hydroxy ethoxyl-1-hexanol-6, in a molar ratio of 3:1, are first dehydrated and then heated with 9.5 parts of tolylene diisocyanate (commercial isomeric mixture 65:35) for 30 minutes to a temperature of 100°C. After the polyhydroxy compound has been dissolved in 100 parts of chlorobenzene, the resulting solution is heated for 30 minutes to 100°C with 23.2 parts of 4,4'-diphenyl methane diisocyanate. The NCO prepolymer solution has an NCO content of 1.40% (NCO content of solid = 2.46%). 5.60 parts of $\beta$-semicarbazide propionic acid hydrazide are dissolved at 70°C in 400 parts of dimethyl acetamide. 200 parts of NCO prepolymer solution (105 poises/20°C) are run into this solution with stirring. The 18.9 percent viscous solution is pigmented with rutile (4 percent based on elastomer content) and is cast into films or wet-spun to form elastic filaments. The results of tests conducted on films and the results of tests on the wet-spun products are set out in Table 5. Graves' tear propogation resistance as measured on films, amounts to 30 kg/cm, and microhardness to 65. The elastomers have a melting point of 230°C.

EXAMPLE 9

100 parts of the above-described polycarbonate are preextended with 9.5 parts of tolylene diisocyanate, and then, following the addition of 100 parts of chlorobenzene, are reacted with 21.1 parts of 4,4'-diphenyl methane diisocyanate to form the NCO prepolymer. The solution has an NCO content of 1.20% (NCO content, based on solids content = 2.18 percent).

4.80 parts of β-semicarbazide propionic acid hydrazide are dissolved in 400 parts of dimethyl formamide and, as already described, the resulting solution is reacted with 20 parts of NCO prepolymer solution and the product of this reaction is cast into films or wet-spun into filaments (cf. Table 5).

EXAMPLE 10

100 parts of a mixed polyester of 1,6-hexane diol and 2,2-dimethyl-1,3-propane diol (molar ratio of the glycols = 65:35) and adipic acid, with a hydroxyl number of 66 (molecular weight 1700) are dehydrated, following the addition of 0.1 part of a 33 percent solution of sulphur dioxide in dioxane (110°C/1 hr/15 mm Hg). Following the addition of 2.0 parts of N,N-bis-(β-hydroxy propyl)-methyl amine and 5 parts of chlorobenzene, the hydroxy compounds are heated for 45 minutes to 100°C with 28.5 parts of 4,4'-diphenyl methane diisocyanate. The NCO prepolymer melt is dissolved in 95 parts of chlorobenzene. The solution has an NCO content of 1.40% (corresponding to 2.4% in the solid NCO prepolymer).

200 parts of the NCO prepolymer solution are run in with stirring at 80°C, in to a solution of 5.70 parts of β-semi-carbazide propionic acid hydrazide in 300 parts of dimethyl sulphoxide, and 20 parts of dimethyl sulphoxide are added to the resulting solution. The 22.5 percent high viscosity elastomer solution obtained is pigmented with 4 percent of rutile (based on the solids content) and is cast into films or wet-spun into elastic filaments. The results are set out in Table 5. The tear propagation resistance of films (according to grades) amounts to 55 kg/cm, and the micro hardness of films to 64. Filaments left in ammoniacal copper sulphate solution (0.01 of normal) remain white in color.

COMPARATIVE TEST (e)

100 parts of the mixed polyester used in Example 1 (molecular weight 1700) are first dehydrated and then admixed with 2.0 parts of N,N-bis-(β-hydroxy propyl)-methyl amine and 5 parts of chlorobenzene, and the resulting product is heated for 50 minutes to 100°C with 29.2 parts of 4,4'-diphenyl methane diisocyanate. The NCO prepolymer is diluted with 95 parts of chlorobenzene, the solution which has a solids content of 50%, has an NCO content of 1.38% (corresponding to 2.51% of NCO in the solid NCO-preadduct).

605 parts of γ-semicarbazide-butyric acid hydrazide (from $C_6H_5$—O—CO—NH—$(CH_3)$—CO—$OCH_3$ + hydrazine hydrate, m.p. 102°C) are dissolved at 120°C in 300 parts of dimethyl formamide. 200 parts of NCO prepolymer solution are run into this hot chain extender solution with thorough stirring, followed by 20 parts of dimethyl formamide. The elastomer solution is then quickly cooled to room temperature. Films and filaments (wet-spinning) are obtained by methods known per se,

EXAMPLE 11

150 parts of the copolyester used in Example 1, which has an OH number of 68 and 37.2 parts of 4,4'-diisocyanato-diphenyl ether are heated for a period of 45 minutes to temperatures between 90° and 98°C in a boiling water bath with 47 parts of chlorobenzene. After cooling to room temperature, the NCO-preadduct solution has an NCO content of 0.816%.

104.5 parts of the NCO-preadduct solution are introduced with intensive stirring into a solution of 4.15 parts of β-semicarbazide propionic acid hydrazide in 232 parts of dimethyl formamide, resulting in the formation of a high viscosity elastomer solution which, following dilution with dimethyl formamide to a solids content of 20 percent has a viscosity of 206 poises at 20°C. After casting into films and cutting into filaments, the elasticity properties are determined. Elastomeric filaments with outstanding (hydro) thermal properties are spun by the standard wet-spinning method (cf. Table 5). The elastomers have a melting point of 244°C.

EXAMPLE 12

14.7 parts of α-semicarbazide acetic acid hydrazide are dissolved at 100°C in 1092 parts of dimethyl formamide and the resulting solution is mixed at 60°C with 356 parts of the NCO-preadduct melt of Example 4, the resulting mixture being homogenized by stirring. The solution is pigmented with 4% of $TiO_2$ (based on the solids content). 1.02 parts of 1,6-hexane diisocyanate and another 80 parts of dimethyl formamide are added to the viscous solution producing an increase in viscosity to 874 poises at 20°C.

After the solution has been cast into films, the elasticity properties of the films are measured on cut filaments. As the results show (Table 5), outstanding strength and elastic properties are obtained. The filaments obtained by wet-spinning tests (or dry-spinning tests), however, only show moderate thermal and hydrothermal properties (comparative test and Example 4). The elastomer substance does not show any signs of discoloration when boiled in tap water or after immersion for 5 minutes in 0.01 molar ammoniacal copper sulphate solution heated to 60°C. The elastomer has a melting point of 213°C.

EXAMPLE 13

800 parts of a mixed polyester of adipic acid and a mixture of ethylene glycol and 1,4-butane diol (molar ratio of the glycols 1:1), molecular weight 1980, melting point 33° – 37°C, are reacted for 100 minutes at 80°C with 192 parts of diphenyl methane-4,4'-diisocyanate and 174 parts of chlorobenzene to form a NCO-preadduct. The solution has an NCO content of 2.56% (3.1% of the NCO in the solid).

100 parts of the NCO-preadduct solution are stirred into a solution heated to 70°C of 4.92 parts of β-semicarbazide propionic acid hydrazide and 0.092 parts of N,N-dimethyl hydrazide in 255 parts of dimethyl formamide, resulting in the formation of a highly viscous slightly hazy solution. Following dilution with dimethyl formamide to a concentration of 20 percent (viscosity 480 poises), films are prepared in the usual way, and filaments are obtained by wet-spinning. The solid elastomer shows improved resistance to light and oxidation and has a melting point of 230°C.

EXAMPLE 14

100 parts of the NCO-preadduct solution described in Example 13, are stirred with a solution of 4.23 parts of β-semicarbazide propionic acid hydrazide and 0.96 part of N,N-bis-(γ-amino propyl)-methylamine in 255 parts of dimethyl formamide (molar ratio of the chain extending agents 80:20), to produce a high viscosity elastomer solution. Filaments or films prepared from this elastomer show a greatly improved affinity for dyes and are fast to dyeing with acid dyes.

EXAMPLE 15

3.97 parts of β-semicarbazide propionic acid hydrazide are dissolved at 70°C in 255 parts of dimethyl formamide and the resulting solution is mixed with 1.12 parts of m-xylylene diamine (molar ratio of the chain extenders 75:25 percent). 103.5 parts of the NCO-preadduct solution described in Example 13 are introduced into this solution over a period of 4 minutes to form a homogeneous highly viscous solution (450 poises/20°C). The elastomer solution is converted in the usual way into films or filaments (see Table 5 for results). The elastomer has a melting point of 237°C.

EXAMPLE 16

107.5 parts of the NCO-preadduct solution used in Example 13 are introduced into a solution of 3.7 parts of β-semicarbazide propionic acid hydrazide and 1.98 parts of 4,4'-diamino diphenyl ether (molar ratio of the chain extenders 70:30) in 259 parts of dimethyl formamide. The resulting highly viscous elastomer solution is diluted with dimethyl formamide to a concentration of 20 percent (160 poises), and then converted into films and filaments (see Table 5 for results). The elastomers have a melting point of 250°C, with softening from 241°C.

EXAMPLE 17

1000 parts of the mixed polyester in Example 1 (hydroxyl number 67.4), 19.5 parts of N,N-bis-(β-hydroxy propyl)-methylamine, 273.2 parts of diphenyl methane-4,4'-diisocyanate and 327 parts of chlorobenzene are heated for 35 minutes to an internal temperature of 90° – 99°C. After cooling, the NCO-preadduct solution has an NCO content of 1.93%.

3.78 parts of β-semicarbazide propionic acid hydrazide are dissolved in 230 parts of dimethyl formamide and the resulting solution is admixed with 0.075 part of ethylene diamine in 32 parts by weight of dimethyl formamide (molar ratio of the chain extenders 95:5). 104 parts of NCO-preadduct solution are added to this solution with stirring resulting in the formation of an elastomer solution having viscosity of 315 poises at 20°C. The solution is converted into films or, after dilution to 20 percent (80 poises), is wet-spun into filaments. The results are set out in Table 5. Melting point 228°C.

EXAMPLE 18

3.18 parts of β-semicarbazide propionic acid hydrazide are dissolved at 70°C in 200 parts of dimethyl formamide and the resulting solution is admixed with 1.00 part of N,N'-bis-(γ-amino propyl)-piperazine in 32 parts of dimethyl formamide (molar ratio of the chain extenders 80:20). 104.5 parts of the NCO-preadduct solution used in Example 17 are mixed in with intensive stirring, resulting in the formation of a homogenous colorless solution with a viscosity of 255 poises. The results of tests conducted on films and filaments are set out in Table 5. The product shows a high affinity for acid dyes with which it can be dyed fast.

EXAMPLE 19

3.58 parts of β-semicarbazide propionic acid hydrazide and 0.64 part of piperazine-N,N'-bis-(propionic acid hydrazide) are dissolved in 232 parts of dimethyl formamide (molar ratio of the chain extenders = 90:10)· 104.5 parts of the NCO-preadduct solution of Example 17 are introduced into this solution at 65°C. After the viscous solution has been diluted with dimethyl formamide to 20 percent concentration, films and filaments are obtained by wet-spinning from the solution (50poises/20°C) in the usual way, cf. Table 5.

EXAMPLE 20

1000 parts of the polyester used in Example 1 (molecular weight 1655), 18.0 parts of N,N-bis-(β-hydroxy propyl)-methylamine, 163.6 parts of p-phenylene diisocyanate and 299 parts of chlorobenzene are heated for 50 minutes to 96° – 99°C and then cooled to room temperature (NCO content of the preadduct solution 1.65%).

410 parts of the above NCO-preadduct solution are introduced at 70°C into a solution of 13.55 parts of β-semicarbazide propionic acid hydrazide in 917 parts of dimethyl formamide, the resulting solution is pigmented with 4 percent of rutile (based on solid elastomer) and then 0.30 part of hexane-1,6-diisocyanate are added.

The elastomer solution (525 poises/20°C) is diluted with dimethyl formamide to a concentration of 20 percent solid substance and is wet-spun in the usual way. The filaments show an extremely high heat distortion temperature at 171°C and a melting point of 246°C.

EXAMPLE 21

510 parts of the NCO-preadduct solution described in Example 20 are introduced into a solution heated to 60°C of 15.25 parts of β-semicarbazide propionic acid hydrazide and 0.3 parts of hydrazine hydrate, followed by the addition of 0.89 part of 1,6-hexamethylene

TABLE 5

| Example number | Filament from process | Elastic properties ||||| Thermal and hydrothermal properties ||||||| Remarks |
|---|---|---|---|---|---|---|---|---|---|---|---|---|---|---|
| | | Tensile strength (g./den.) | Breaking elongation (percent) | Modulus (mg./den.) || Permanent elongation after 3×300% (percent) | HDT (°C.) | HWDT strain. (mg./den.) || Residual elongation after hydro-thermal load (percent) | HWE extension (percent) || Residual elongation after relaxation in air 20°C. (percent) | |
| | | | | At 300% | At 150% 3rd recovery curve | | | In air 20°C. | In water 95°C. | | In air 20°C. | In water 95°C. | | |
| 5 | F | 0.60 | 626 | 139 | 24 | 18 | 175 | 55.6 | 26.6 | 32 | 46 | 130 | 62 | (Hydro)thermal properties poorer than in Example 5. |
|   | N | 0.52 | 588 | 159 | 24 | 20 | | | | | | | | |
| 6 | F | 0.75 | 583 | 130 | 24 | 18 | 159 | 48.5 | 15.7 | 51 | 56 | 248 | 128 | Filaments resistant to hydrolysis. |
|   | N | 0.70 | 593 | 142 | 23 | 23 | | | | | | | | |
| 7 | F | 0.58 | 476 | 121 | 22 | 15 | 163 | 47.0 | 20.2 | 38 | 56 | 186 | 80 | |
|   | N | 0.78 | 460 | 190 | 25 | 28 | 165 | 57.6 | 21.4 | 48 | 42 | 138 | 76 | |
| 8 | F | 0.75 | 400 | 243 | 28 | 15 | 159 | | | | | | | |
| 9 | F | 0.87 | 480 | 209 | 20 | 28 | 168 | 53.0 | 21.1 | 39 | 50 | 140 | 66 | Properties of the elastomeric filaments too poor. |
| 10 | N | 0.54 | 555 | 128 | 20 | 18 | | | | | | | | |
| Comparison test (e) | F | 0.50 | 406 | 76 | 15 | 25 | 130 | 33.5 | 8.7 | 60 | Filaments break, indeterminable || |
| 11 | F | 0.54 | 524 | 125 | 20 | 16 | 166 | 61.5 | 25.2 | 42 | 74 | 146 | 72 | (Hydro)thermal properties much poorer than in Example 4. |
|   | N | 0.53 | 436 | 179 | 25 | 20 | | | | | | | | |
| 12 | F | 0.68 | 488 | 118 | 22 | 16 | 149 | 43.1 | 13.4 | 45 | 72 | 382 | 182 | |
|   | N | 0.60 | 470 | 157 | 21 | 17 | | | | | | | | |
| 13 | F | 0.60 | 680 | 143 | 22 | 23 | 164 | 49.5 | 18.3 | 46 | 58 | 158 | 74 | |
| 15 | F | 0.76 | 755 | 89 | 20 | 13 | 162 | 43.8 | 17.7 | 40 | 56 | 204 | 90 | |
|   | N | 0.60 | 610 | 127 | 22 | 15 | | | | | | | | |
| 16 | F | 0.62 | 745 | 78 | 16 | 15 | | 40.6 | 17.0 | 38 | 64 | 250 | 104 | |
|   | N | 0.68 | 666 | 117 | 20 | 15 | | | | | | | | |
| 17 | F | 0.75 | 542 | 109 | 22 | 14 | 152 | | | | | | | Filaments highly receptive to acid dyes. |
| 18 | F | 0.66 | 554 | 95 | 21 | 14 | 152 | | | | | | | |
| 19 | F | 0.73 | 578 | 110 | 22 | 15 | 159 | | | | | | | |
| 20 | N | 0.64 | 559 | 138 | 22 | 15 | 171 | 43.9 | 18.2 | 36 | 68 | 174 | 70 | |
| 21 | N | 0.65 | 714 | 105 | 20 | 11 | 168 | 43.0 | 20.5 | 36 | 60 | 204 | 84 | |
| 22 | N | 0.59 | 567 | 126 | 19 | 16 | 159 | 38.2 | 17.5 | 36 | 76 | 234 | 94 | |

F = Results of tests on cut yarns of films obtained by spreading the solution on to glass plates and evaporating off the solvent at 100° C.
N = Standard wet spin process: spinning 20% by weight elastomer solutions into a bath of 90% water, 10% dimethylformamide. The elastomeric filaments mentioned in Examples 5 to 19 do not discolour when treated with dilute solutions of heavy metal salts (e.g. CuSO₄). The inherent viscosity of elastomers of Examples 5 to 22 is within a range from 0.7 to 1.9.

diisocyanate. The resulting viscous elastomer solution is cast into films or is wet-spun into filaments. The filaments have an extremely high heat distortion temperature of 168°C and a melting point of 238°C.

EXAMPLE 22

800 parts of a mixed polyester of adipic acid and a diol mixture of 60 mol percent of 1,6-hexane diol and 40 parts of 2,2-dimethyl-1,3-propane diol (molecular weight 2160) are heated for 50 minutes to 85° – 88°C with 14.9 parts of N,N-bis-(β-hydroxy propyl)-methyl amine and a solution of 187.4 parts of diphenyl methane-4,4'-diisocyanate in 254 parts of chlorobenzene. The NCO-preadduct solution formed has an NCO content of 1.87%.

410 parts of the above NCO-preadduct solution are introduced into a solution heated to approximately 70°C of 15.45 parts of β-semicarbazido propionic acid hydrazide in 925 parts of dimethyl formamide, producing an increase in the viscosity of the solution to 735 poises/20°C. After pigmenting with 4% by weight of $TiO_2$ (based on solid elastomer) the solution is converted into filaments and films in the usual way.

We claim:

1. A semicarbazide-alanyl-hydrazide of the formula $H_2N-NH-CO-NH-(CH_2)_2-CO-NH-NH_2$.

* * * * *